United States Patent
Mashimo et al.

(10) Patent No.: US 6,807,135 B1
(45) Date of Patent: Oct. 19, 2004

(54) TILT DETECTION SYSTEM, TILT DETECTION METHOD AND TILT ADJUSTMENT METHOD

(75) Inventors: Akira Mashimo, Tokorozawa (JP); Keishi Ueno, Hanno (JP)

(73) Assignee: Teac Corporation, Tokyo (JP)

( * ) Notice: Subject to any disclaimer, the term of this patent is extended or adjusted under 35 U.S.C. 154(b) by 836 days.

(21) Appl. No.: 09/659,089

(22) Filed: Sep. 11, 2000

(30) Foreign Application Priority Data

Sep. 16, 1999 (JP) .......................................... 11-261588

(51) Int. Cl.⁷ .................................................. G11B 7/00
(52) U.S. Cl. .................................. 369/53.19; 369/44.21
(58) Field of Search ....................................... 369/53.19

(56) References Cited

U.S. PATENT DOCUMENTS 5,001,690 A    3/1991   Kamiya et al.
5,703,852 A *  12/1997  Kumagai ................... 369/53.3
5,812,009 A *  9/1998   Matsuura .................... 327/362
6,631,103 B1 * 10/2003  Yamanoi et al. ......... 369/47.17

FOREIGN PATENT DOCUMENTS

JP    01-199329    8/1989
JP    08-045095    2/1996

* cited by examiner

*Primary Examiner*—Aristotelis M. Psitos
(74) *Attorney, Agent, or Firm*—Anderson Kill & Olick, P.C.; Eugene Lieberstein; Michael N. Meller

(57) ABSTRACT

A tilt detection system includes an optical disk having a series of data recorded therein, the series of data having a pulse width smaller than the minimum pulse width of data recorded in an ordinary optical disk; a reproducing part reproducing a signal from the optical disk by emitting a light beam onto the optical disk; and a tilt detecting part detecting a tilt of the light beam with respect to the optical disk based on a reproduced RF signal provided by the reproducing part when the series of data having the smaller pulse width is reproduced.

4 Claims, 8 Drawing Sheets

US 6,807,135 B1

TILT DETECTION SYSTEM, TILT DETECTION METHOD AND TILT ADJUSTMENT METHOD

BACKGROUND OF THE INVENTION

1. Field of the Invention

The present invention relates to tilt detection system, tilt detection method and tilt adjustment method in an optical disk drive for detecting/adjusting a tilt of a light beam with respect to a disk recording surface.

2. Description of the Related Art

A light beam emitted from a semiconductor laser is incident on a recording surface of an optical disk at right angles through an objective lens for reading a signal recorded on the optical disk. However, when the light beam is not incident on the recording surface of the optical disk at right angles due to inclination of the optical disk and/or inclination of the objective lens, coma aberration is generated. As the coma aberration increases, the cross talk increases, and the S/N ratio of the read signal is degraded. Thereby, distortion occurs in the reproduced waveform, and jitter occurs, as is well known.

Therefore, in order to adjust the tilt of light beam with respect to the optical disk, ordinarily, the jitter amount of the RF waves reproduced from the optical disk is measured for radial direction and tangential direction of the optical disk (hereinafter, the term 'of the optical disk' in 'radial/tangential direction of the optical disk' being omitted) separately, with the optical disk in the reproduced condition, and the respective tilts are adjusted so that the jitter amount becomes minimum. This adjustment may be made as a result of the pickup of the optical disk drive being inclined or as a result of the spindle motor of the optical disk drive being inclined.

FIGS. 1A and 1B show the jitter amount of the reproduced RF signal with respect to the tilt in radial direction and the jitter amount of the RF signal with respect to the tilt in tangential direction, respectively, at the time of tilt adjustment. The jitter amount is minimum when the tilt is 0, and the jitter amount increases as the tilt increases. The inclination of the pickup or spindle motor for radial direction and tangential direction is adjusted, where the state (inclination) of the pickup or spindle motor in which the jitter amount is minimum is regarded as the optimum state in tilt adjustment.

As shown in FIG. 1B, change in jitter amount with respect to the tilt in tangential direction is steep about the point at which the tilt is 0. Accordingly, it is easy to find the optimum state in tilt adjustment, and, thus, to adjust the tilt optimally. However, as shown in FIG. 1A, change in jitter amount with respect to the tilt in radial direction is gentle about the point at which the tilt is 0. Accordingly, it is difficult to find the optimum state in tilt adjustment, and, thus, to adjust the tilt optimally.

SUMMARY OF THE INVENTION

An object of the present invention is to provide a tilt detection system by which it is possible to easily detect the optimum state in tilt adjustment also for radial direction similarly to the case for tangential direction, and to perform the tilt adjustment precisely and easily.

Tilt detection according to the present invention comprises:

recording in an optical disk a series of data recorded, the series of data having a pulse width smaller than the minimum pulse width of data recorded in an ordinary optical disk;

reproducing a signal from the optical disk by emitting a light beam onto the optical disk; and detecting a tilt of the light beam with respect to the optical disk based on a reproduced RF signal provided by the reproducing part when the series of data having the smaller pulse width is reproduced.

In this configuration, as a result of a signal being reproduced from an optical disk in which information inverts faster than data having the minimum pulse width recorded in an ordinary optical disk, the quality of the recorded data is degraded, and the quality of the reproduced signal sensitively responds to, change in the tilt. Accordingly, even in radial direction, it is easy to detect the optimum state in tilt adjustment similarly to the case of tangential direction, and thus to perform the tilt adjustment precisely and easily.

Tilt detection according to another aspect of the present invention comprises:

reproducing a signal from the optical disk;

decreasing a gain of a low-pass filter limiting a for the highest frequency of predetermined essential frequencies of a reproduced RF signal obtained from the reproduction the signal from the optical disk; and detecting a tilt based on the signal having the above-mentioned highest frequency having passed the low-pass filter.

In this configuration, the low-pass filter limits the frequency band of the signal obtained through reproducing, and decreases the amplitude of the signal of the above-mentioned highest frequency of the signal obtained through the reproduction. Thereby, the quality of the signal in of the highest frequency is degraded, and the quality of the reproduced signal sensitively responds to change in the tilt. Accordingly, even in radial direction, it is easy to detect the optimum state in tilt adjustment similarly to the case of tangential direction, and to perform the tilt adjustment precisely and easily.

Tilt detection according to another aspect of the present invention comprises:

reproducing at a speed higher than an ordinary speed a signal from an optical disk having data recorded therein in an ordinary recording density; and detecting the tilt based on a reproduced RF signal obtained through the reproduction.

In this configuration, data of the optical disk in which recording is made at an ordinary speed is reproduced at a speed higher than the ordinary speed. Thereby, the quality of the signal is degraded, and the quality of the reproduced signal sensitively responds to change in tilt. Accordingly, even in radial direction, it is easy to detect the optimum state in tilt adjustment similarly to the case of tangential direction, and to perform the tilt adjustment precisely and easily.

Other objects and further features of the present invention will become more apparent from the following detailed description when read in conjunction with the accompanying drawings.

DETAILED DESCRIPTION OF THE PREFERRED EMBODIMENTS

Embodiments of the present invention will now be described with reference to figures.

FIGS. 2 through 5 illustrate a first embodiment of the present invention.

Figure 2:
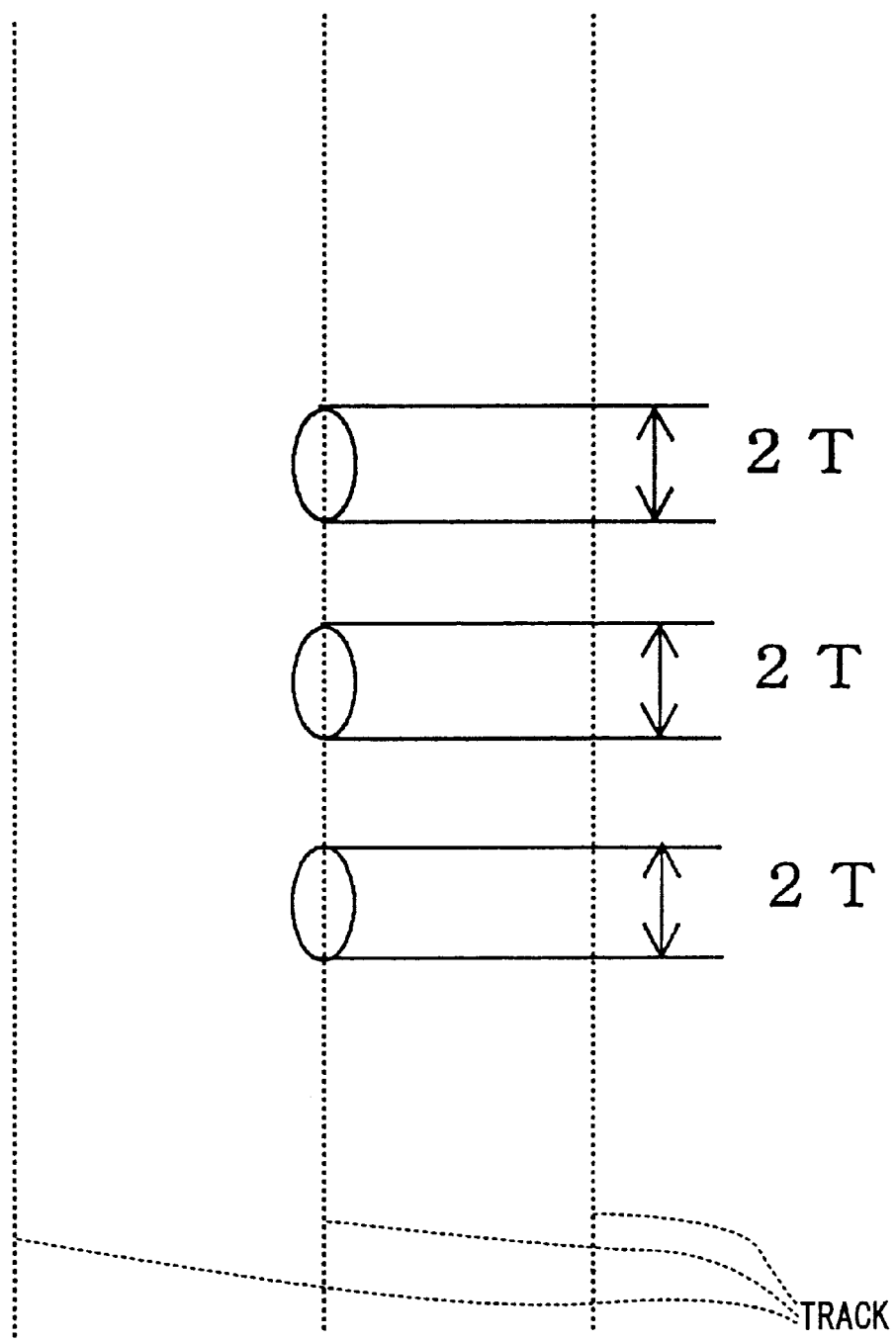
FIG. 2 shows patterns recorded in an optical disk according to a first embodiment of the present invention.

In the first embodiment of the present invention, a successive 2T patterns, as shown in FIG. 2, are formed at a part of the track of an ordinary CD-ROM disk for the tilt adjustment.

In the ordinary CD-ROM disk, an EFM-modulated signal is recorded in a form of pits. This signal has pulse widths of 3T through 11T where T is a duration corresponding to 1 channel bit. In contrast to this, in the track of the optical disk shown in FIG. 2, in addition to the patterns corresponding to the signal recorded in the ordinary optical disk as mentioned above, the patterns each having the length corresponding to the pulse width 2T is formed which is narrower than the pulse width 3T which is the minimum one of those of the signal recorded in the ordinary optical disk.

Figure 3A:
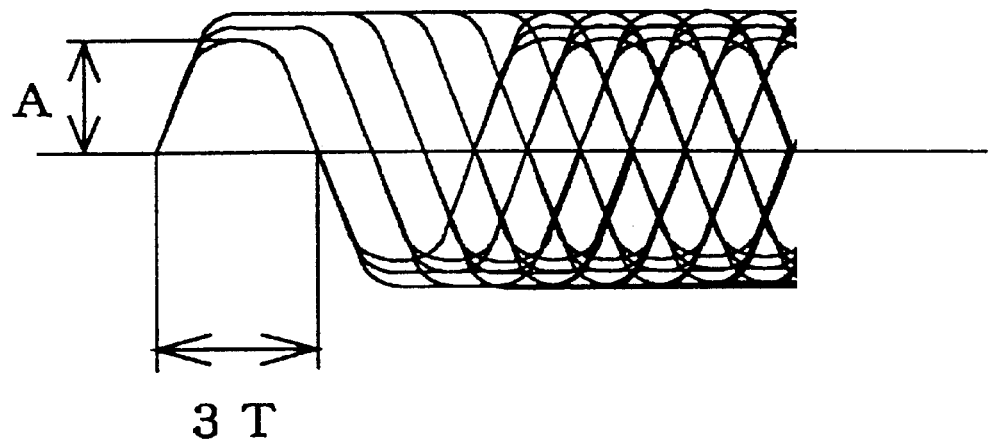
FIGS. 3A and 3B show the eye patterns obtained when data (FIG. 3A for 3T patterns and FIG. 3B for 2T patterns) recorded in the optical disk is reproduced.
Figure 3B:
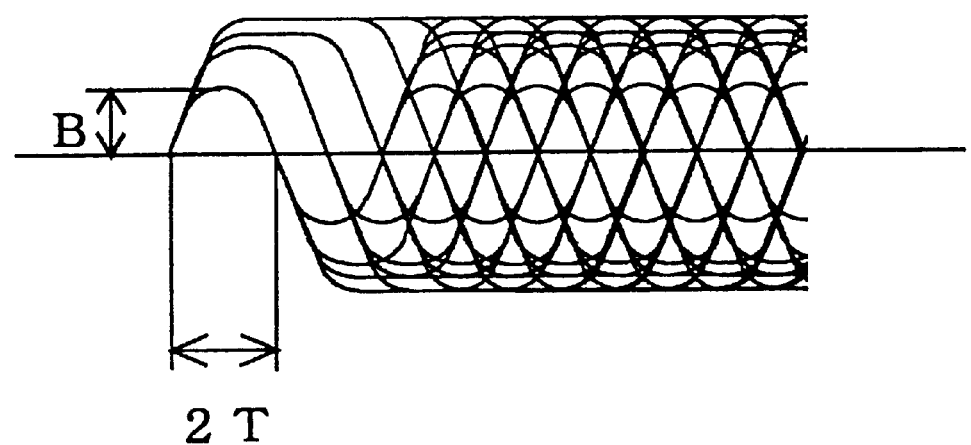

FIG. 3A shows the eye pattern of the RF signal obtained when a reproducing operation is performed on the ordinary optical disk, and FIG. 3B shows the eye pattern of the RF signal obtained when the reproducing operation is performed on the optical disk described with reference to FIG. 2.

For pulses of the signal having a narrow width, differential waves of both rise edge and decay edge thereof are interfered by one another, resolution is degraded, and the amplitude of waves obtained from integration thereof decreases. Accordingly, the amplitude B of the 2T-pulse data shown in FIG. 3B of the narrow pulse width is smaller than the amplitude A of the 3T-pulse data shown in FIG. 3A.

Further, because the jitter amount increases as the level of the detection signal decreases, the jitter amount of the reproduced signal of the 2T-pulse data is large.

In such a severe reproducing condition for the 2T-pulse data, the quality of reproduced signal responds to the tilt of the light beam with respect to the recording surface of the optical disk (the term 'of the light beam with respect to the recording surface of the optical disk' thereof being omitted, hereinafter) sensitively.

Figure 4:
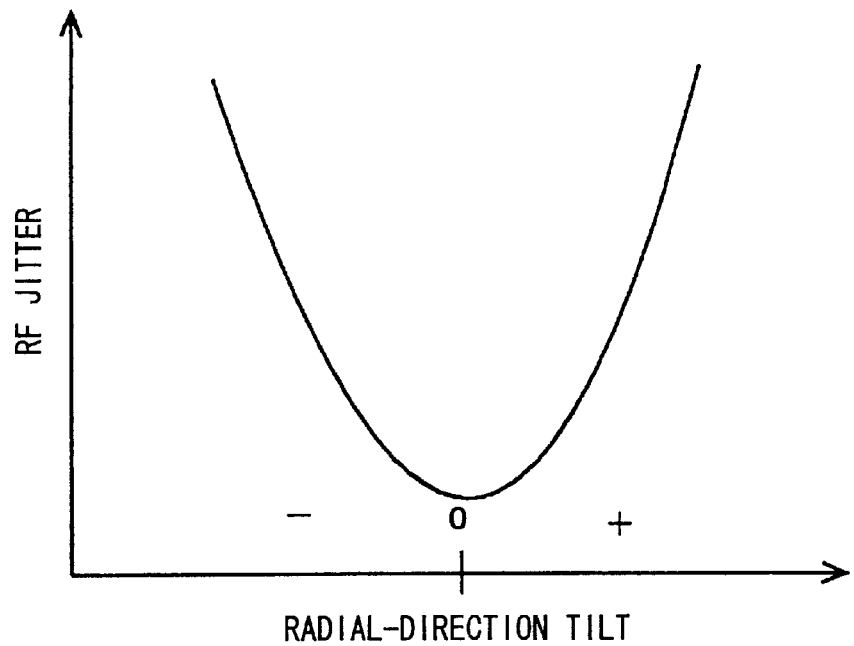
FIG. 4 shows change in jitter amount with respect to tilt in radial direction for illustrating the present invention.

FIG. 4 shows the jitter amount of the 2T-pulse data with respect to the tilt in radial direction.

Figure 1A:
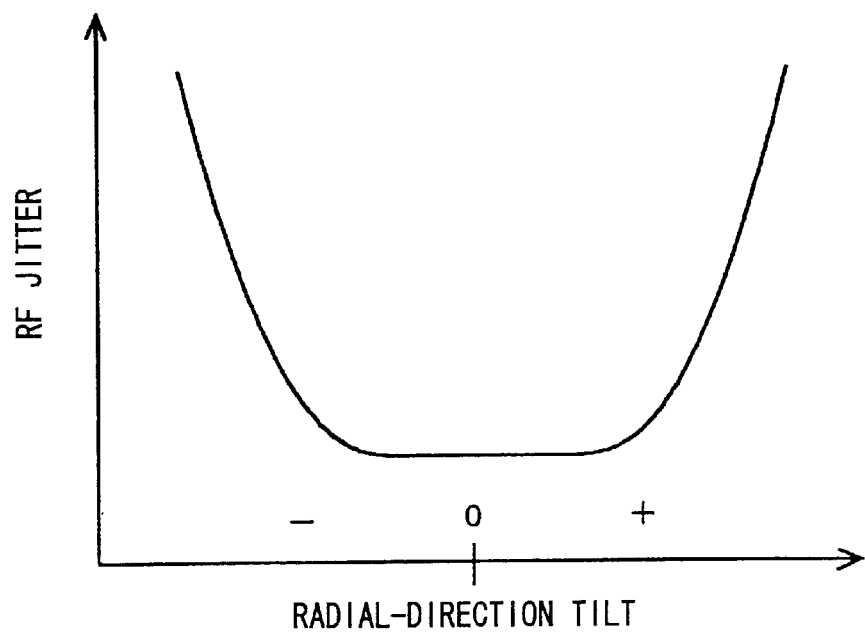
FIGS. 1A and 1B show change in jitter amount with respect to tilt in radial direction and tangential direction in detection of tilt in the related art.
Figure 1B:
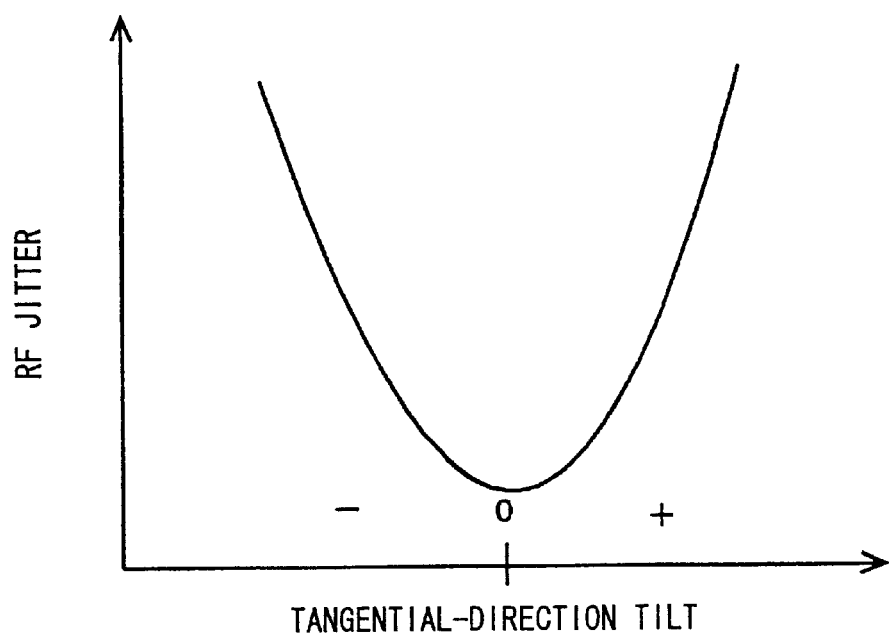

As shown in the figure, change in jitter amount with respect to the tilt in radial direction is steep similar to change in jitter amount with respect to the tilt in tangential direction shown in FIG. 1B.

Accordingly, it is possible to easily detect the optimum state in tilt adjustment also for radial direction, and to easily and precisely perform the tilt adjustment.

Figure 5:
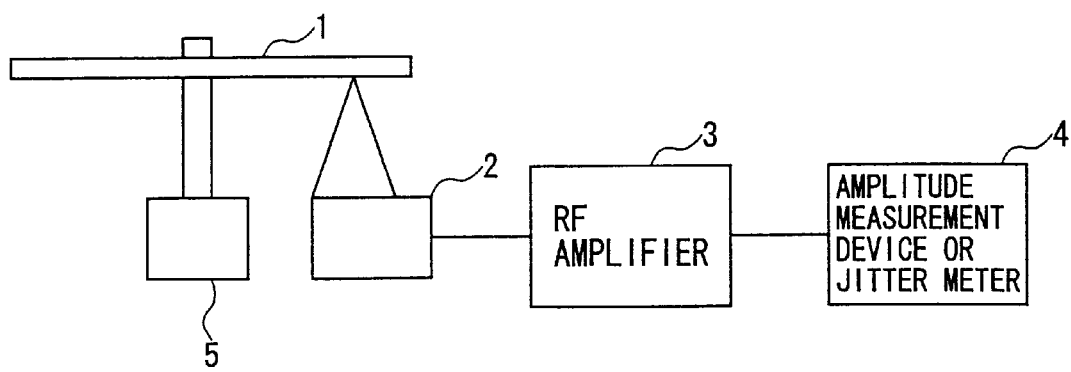
FIG. 5 shows a circuit diagram of a tilt detecting circuit in the first embodiment of the present invention.

FIG. 5 shows a circuit diagram of a tilt detection system in an optical disk drive in the first embodiment of to the present invention using the optical disk described with reference to FIG. 2.

The reproduced light (reflected light) from the optical disk 1 rotated by a disk motor 5 in a predetermined manner is detected by a photodetector in an optical pickup 2, and is converted into an electric signal therethrough, and, then, is input to an RF amplifier 3 which amplifies the input signal in a predetermined manner. The thus-amplified signal is input to a data pulse amplitude measurement device or jitter meter 4.

The data pulse amplitude measuring device detects the 2T-pulse data. Then the inclination of the pickup 2 or disk motor 5 is adjusted so that the thus-detected amplitude becomes maximum.

The inclination at which the amplitude is maximum is the optimum inclination (optimum state).

This adjustment of the inclination is performed for the two axes of radial direction and tangential direction.

In the case of jitter meter, the 2T-data pulses are extracted from the binary signal obtained from the reproduced RF signal, the number of reference clock pulses occurring during each pulse width of the extracted 2T-data pulses is counted, and, thus, the jitter amount is measured.

Then, the inclination of the pickup 2 or disk motor 5 is adjusted so that the thus-measured jitter amount becomes minimum.

The inclination at which the jitter amount becomes minimum is the optimum inclination (optimum state).

This adjustment of inclination is performed for the two axes of radial direction and tangential direction.

Thus, in the first embodiment, the data (2T-pulse data) having the inverting width shorter than that of the ordinary data is recorded in the optical disk, and the thus-recorded data is reproduced.

By using the thus-obtained reproduced signal, it is possible to easily and precisely detect the optimum state (inclination) of tilt adjustment in radial direction.

However, because the 2T patterns are special patterns, it is necessary to limit the frequency of occurrences of the patterns to the range within which the position control system of the optical disk drive is not adversely affected thereby.

A second embodiment and a variant embodiment thereof of the present invention will now be described with reference to FIGS. 6, 7A, 7B, 8A and 8B.

In each of the second embodiment and variant embodiment, the tilt adjustment is performed in a condition in which the gain characteristics of a low-pass filter of an optical disk drive are changed, and, thereby, the reproduction characteristics are made severe.

Figure 6:
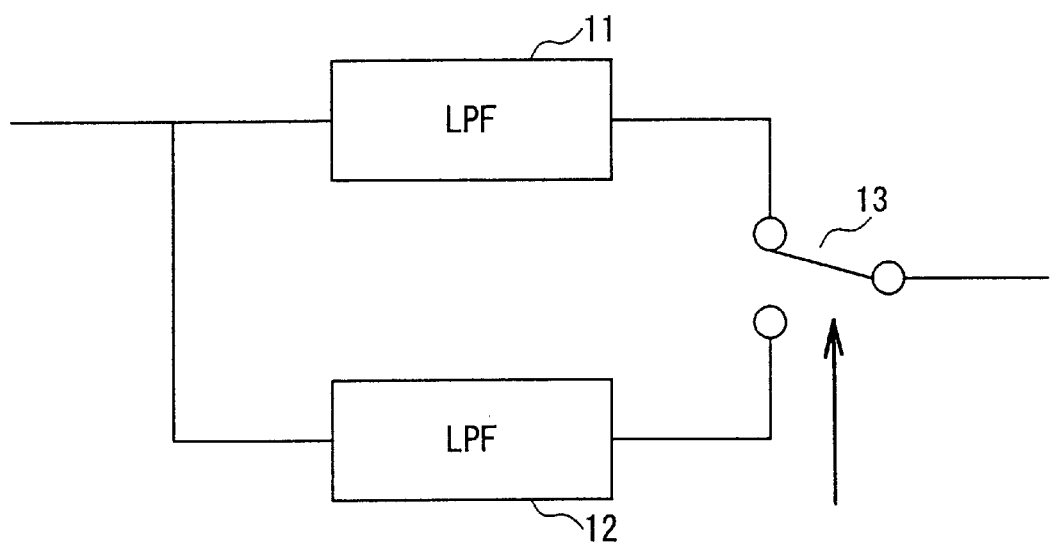
FIG. 6 shows low-pass filters provided in an RF amplifier in each of a second embodiment and a variant embodiment thereof of the present invention.

FIG. 6 shows low-pass filters included in an equalizer of an RF amplifier of the optical disk drive.

Figure 7A:
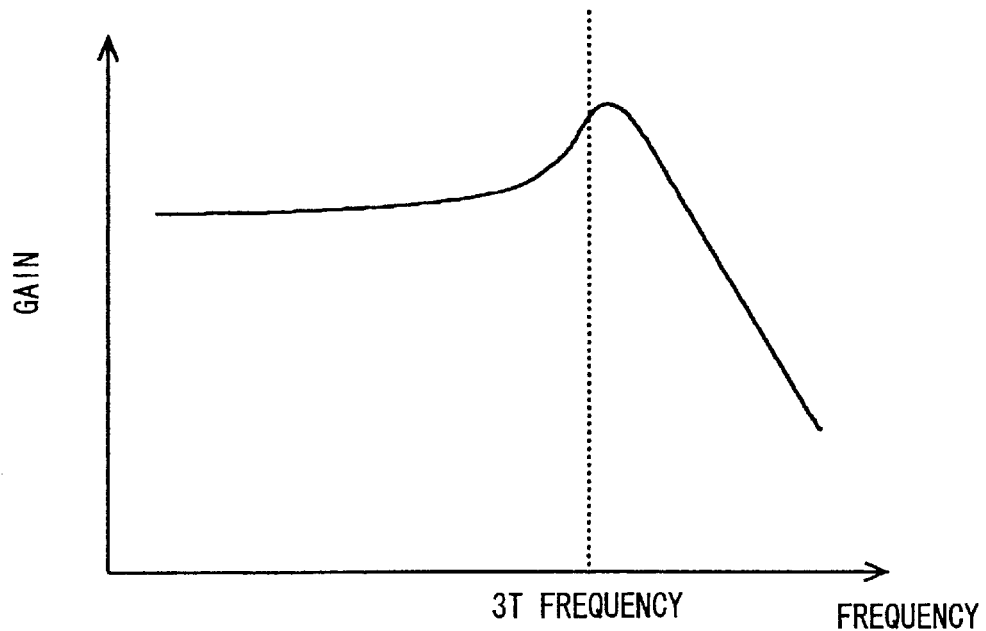
FIGS. 7A and 7B show gain characteristics of the low-pass filters shown in FIG. 6.
Figure 7B:
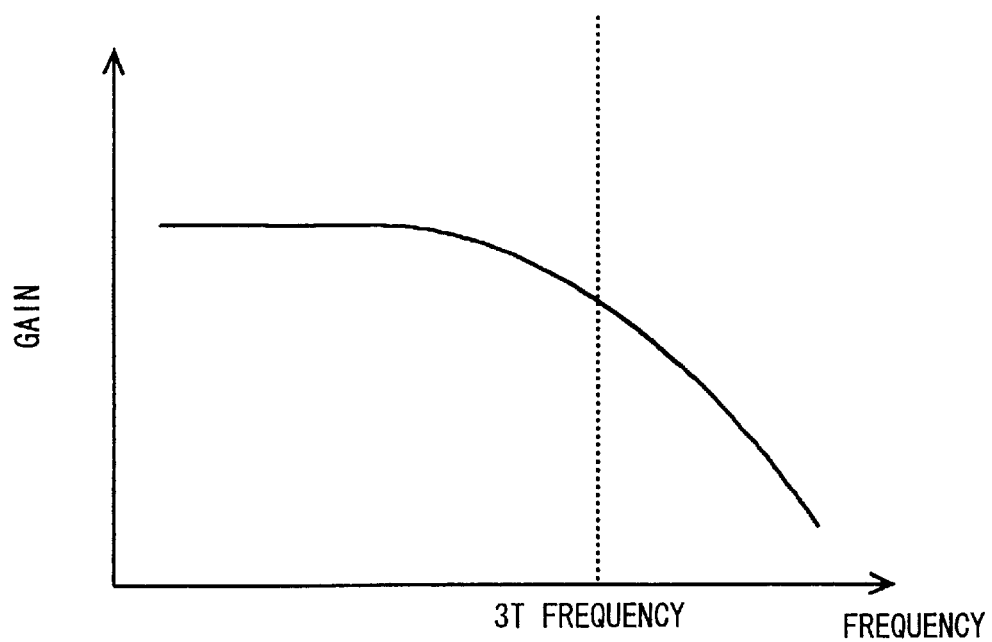

The low-pass filter 11 has the gain characteristics shown in FIG. 7A such that the gain becomes the peak about the frequency corresponding to the above-mentioned 3T. In contrast to this, the low-pass filter 12 has the gain characteristics shown in FIG. 7B such that the gain decreases about the frequency corresponding to 3T.

As shown in FIG. 6, the low-pass filters 11 and 12 are connected in parallel, and one of them is selected by a change-over switch 13. The switch 13 is controlled by instructions provided by a CPU.

In an ordinary mode, the CPU provides the instructions to the switch 13 such that the low-pass filter 11 is selected thereby. However, in a tilt-adjustment mode, the CPU provides the instructions to the switch 13 such that the low-pass filter 12 is selected thereby.

In the tilt-adjustment mode, the reproduced signal from the optical disk passes through the low-pass filter 12, the frequency band of the signal is narrowed thereby, the amplitude of the 3T-pulse data decreases, the resolution is degraded, and both jitter amount and error rate increase.

As a result of the reproduction condition being thus made severe, the responsivity of the quality of the reproduced signal to the tilt amount increases. As a result, change in jitter amount with respect to the tilt in radial direction becomes steep so as to be similar to change in jitter amount with respect to the tilt in tangential direction shown in FIG. 1B. Accordingly, it is possible to easily detect the optimum state in tilt adjustment in radial direction, and to easily and precisely perform the appropriate tilt adjustment.

Figure 8A:
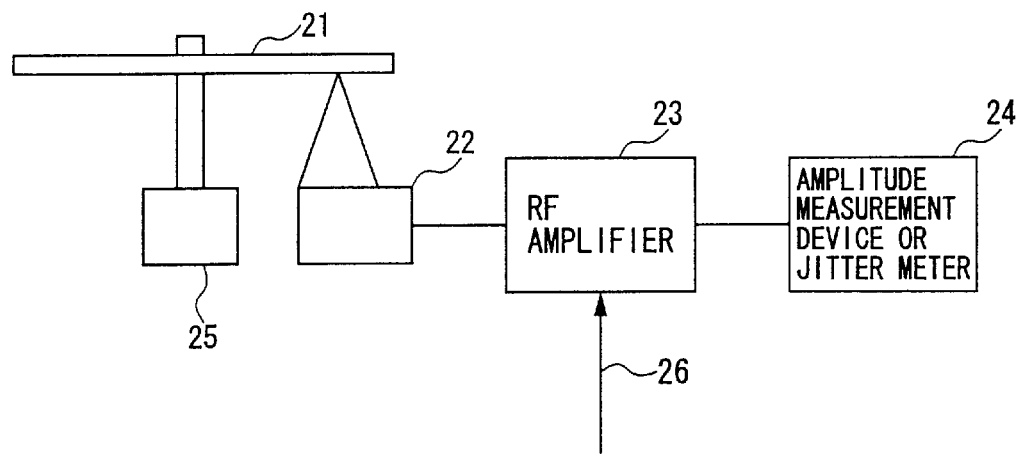
FIGS. 8A and 8B show circuit diagrams of tilt detecting circuits in the second embodiment and variant embodiment thereof of the present invention, respectively.

FIG. 8A shows a circuit configuration of a tilt detection system in the optical disk drive of the above-described second embodiment.

A reproduced light (reflected light) from an optical disk 21 rotated in a predetermined manner by a disk motor 25 is detected by a photodetector in an optical pickup 22, and is converted into an electric signal therethrough, and, then, is input to the above-mentioned RF amplifier 23 which amplifies the input signal in a predetermined manner. The thus-amplified signal is input to a data pulse amplitude measurement device or jitter meter 24. Further, the CPU provides a control signal 26 to the RF amplifier 23 for switching the low-pass filter included therein.

The low-pass filter 12 selected in accordance with the instructions from the CPU has the gain thereof about the frequency corresponding to 3T lowered as mentioned above. Accordingly, the amplitude of the 3T-pulse data output from the RF amplifier 23 is reduced. The data pulse amplitude measurement device detects the amplitude of the 3T-pulse data.

Then, the inclination of the pickup 22 or disk motor 25 is adjusted and thus the tilt adjustment is performed so that the thus-detected amplitude becomes maximum. The inclination at which the amplitude is maximum is the optimum inclination (optimum state).

This adjustment of the inclination is performed for the two axes of radial direction and tangential direction.

In the case of jitter meter, the 3T-data pulses are extracted from the binary signal obtained from the reproduced RF signal, the number of reference clock pulses occurring during each pulse width of the extracted 3T-data pulses is counted, and, thus, the jitter amount is measured.

The inclination of the pickup 22 or disk motor 25 is adjusted and thus the tilt adjustment is performed so that the thus-measured jitter amount becomes minimum. The inclination at which the jitter amount is minimum is the optimum inclination (optimum state).

This adjustment of inclination is performed for the two axes of radial direction and tangential direction.

Figure 8B:
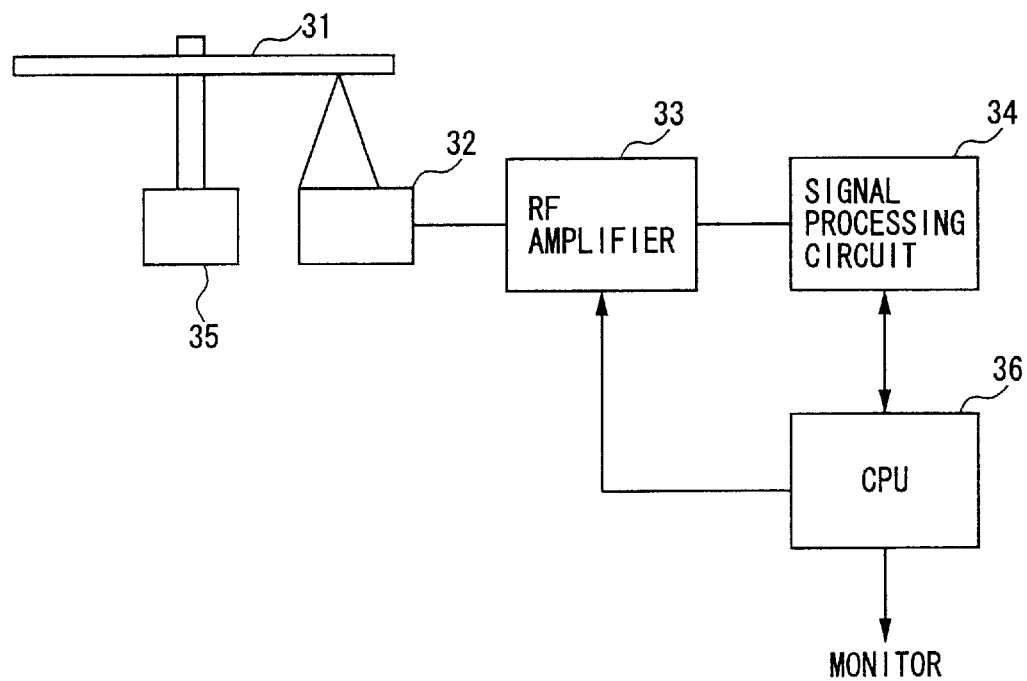

FIG. 8B shows a circuit configuration of a tilt detection system in an optical disk drive in the variant embodiment of the above-described second embodiment of the present invention in which the tilt is detected as a result of the error rate being detected.

A reflected light (reproduced light) from an optical disk 31 rotated in a predetermined manner by a disk motor 35 is detected by a pickup 32, is converted into an electric signal therethrough, and, then, is amplified by an RF amplifier 33 (the same as the above-mentioned RF amplifier 23, and thus including the low-pass filters 11, 12 and changeover switch 13 shown in FIG. 6) in a predetermined manner.

In the tilt adjustment mode, the low-pass filter 12 is selected in accordance with the instructions from the CPU 36, and has the gain thereof about the frequency corresponding to 3T lowered as mentioned above. Accordingly, the amplitude of the 3T-pulse data output from the RF amplifier 33 is reduced.

The thus-amplified signal is input to a signal processing circuit 34. The signal processing circuit 34 performs EMF demodulation of the input signal, and, then, performs error detection and correction using CIRC. The state of the error correction performed there, and thereby the error rate, can be informed of to, and then be monitored through a CPU 36.

An operator thus monitors the error rate through the CPU 36 while adjusting the inclination of the pickup 32 or disk motor 35 so that the thus-detected error rate becomes minimum, and, thus, performing the tilt adjustment.

Thus, the inclination of the pickup 32 or disk motor 35 is thus adjusted and thus the tilt adjustment is performed so that the thus-monitored error rate becomes minimum. The inclination at which the error rate is minimum is the optimum inclination (optimum state).

This adjustment of inclination is performed for the two axes of radial direction and tangential direction.

A third embodiment of the present invention will now be described.

In each of the third embodiment and a variant embodiment thereof, the tilt adjustment is performed in a condition in which an ordinary optical disk is rotated at a rotation speed higher than the ordinary rotation speed, and, thereby, the reproduction characteristics are made severe.

Figure 9A:
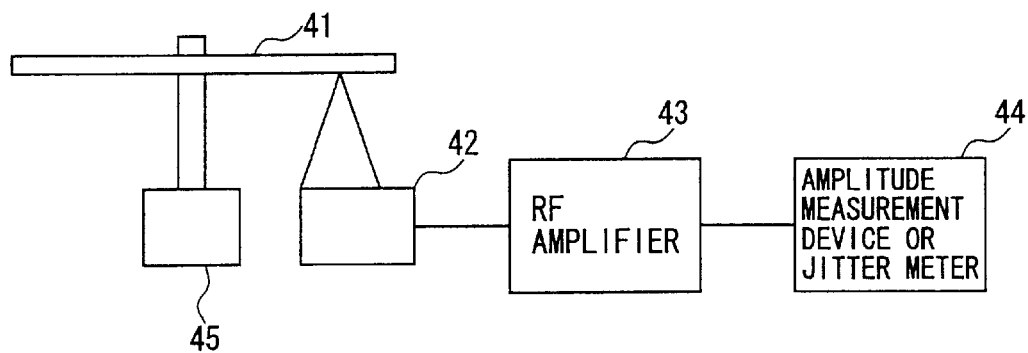
FIGS. 9A and 9B show circuit diagrams of tilt detecting circuits in a third embodiment and a variant embodiment thereof of the present invention, respectively.

FIG. 9A shows a circuit configuration of a tilt detection system in an optical disk drive in the third embodiment of the present invention.

When the rotation speed of the optical disk is increased, the resolution of the thus-obtained reproduced signal is degraded. At this time, the 3T-data pulse having the narrow pulse width is affected thereby remarkably, the reproduced amplitude decreases, and both jitter amount and error rate increase.

As a result of the reproduction condition being thus made severe, change in amplitude/jitter amount with respect to the tilt becomes steep, and, thereby, the appropriate tilt adjustment can be performed easily and precisely.

FIG. 9A shows the circuit configuration for the tilt detection performed as a result of the amplitude or jitter amount of the 3T-pulse data being thus detected.

A reproduced light from the optical disk 41 rotated in a predetermined manner by a disk motor 45 is converted into an electric signal through a photodetector in a pickup 42, and, then, is amplified by an RF amplifier 43 in a predetermined manner. Thus thus-amplified signal is input to a data pulse amplitude measurement device or jitter meter 44.

The data pulse measurement device detects the amplitude of the 3T-pulse data. The inclination of the pickup 42 or disk motor 45 is adjusted and thus the tilt adjustment is performed so that the thus-detected amplitude becomes maximum. The inclination at which the amplitude is maximum is the optimum inclination (optimum state).

Figure 9B:
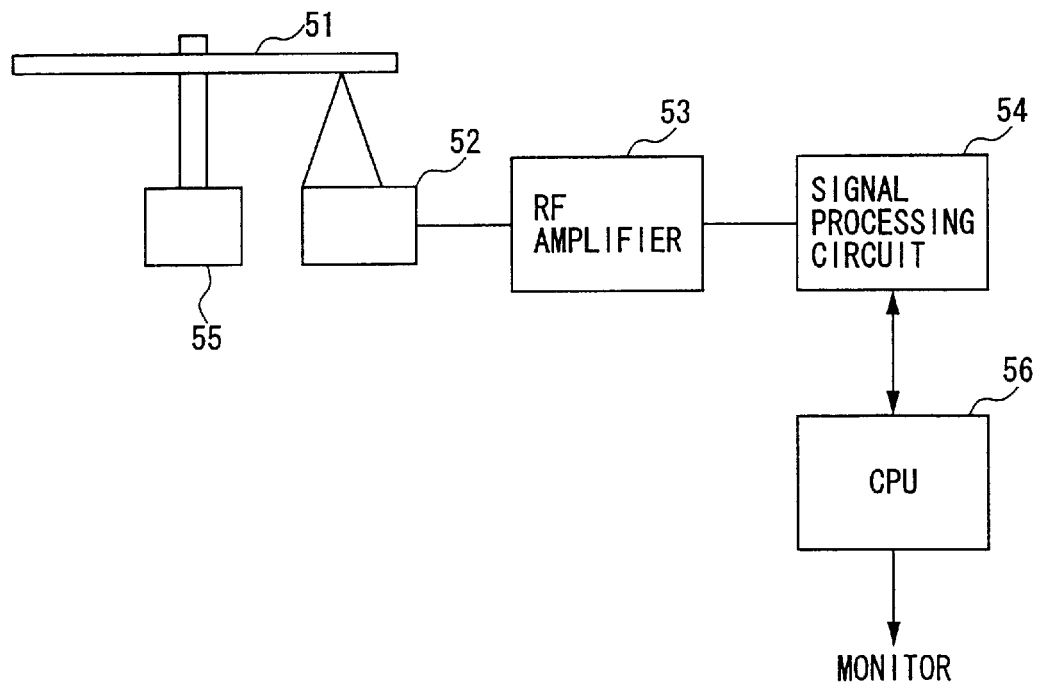

FIG. 9B shows a circuit configuration of a tilt detection system in an optical disk drive in the variant embodiment of the above-described third embodiment of the present invention in which the tilt is detected as a result of the error rate being detected.

A reflected light (reproduced light) from an optical disk 51 rotated in a predetermined manner at the rotation speed higher than the ordinary rotation speed by a disk motor 55 is detected by a pickup 52, is converted into an electric signal therethrough, and, then, is amplified by an RF amplifier 53 in a predetermined manner.

The thus-amplified signal is input to a signal processing circuit 54. The signal processing circuit 54 performs EMF demodulation of the input signal, and, then, performs error detection and correction using CIRC. The state of the error correction performed there, and thereby the error rate, can be informed of to, and then be monitored through a CPU 56.

An operator thus monitors the error rate through the CPU 56 while adjusting the inclination of the pickup 52 or disk motor 55 so that the thus-detected error rate becomes minimum, and, thus, performing the tilt adjustment.

Thus, the inclination of the pickup 52 or disk motor 55 is thus adjusted and thus the tilt adjustment is performed so that the thus-monitored error rate becomes minimum. The inclination at which the error rate is minimum is the optimum inclination (optimum state).

The present invention is not limited to the above-described embodiments, and variations and modifications may be made without departing from the scope of the present invention.

The present application is based, on Japanese priority application No. 11-261588, filed on Sep. 16, 1999, the entire contents of which are hereby incorporated by reference.

What is claimed is:

1. A tilt detection system comprising:

a reproducing part reproducing a signal from an optical disk by emitting a light beam onto said optical disk;

a low-pass filter having a gain decreased for the highest frequency of predetermined essential frequencies of a reproduced RF signal provided by said reproducing part; and a tilt detecting part detecting a tilt of the light beam with respect to the optical disk based on the signal having said highest frequency having passed said low-pass filter.

2. An optical disk drive comprising:

a reproducing part reproducing a signal from an optical disk by emitting a light beam onto said optical disk;

a low-pass filter having a gain decreased for the highest frequency of predetermined essential frequencies of a reproduced RF signal provided by said reproducing part; and a tilt detecting part detecting a tilt of the light beam with respect to the optical disk based on the signal having said highest frequency having passed said low-pass filter.

3. A tilt detection method comprising the steps of:

a) reproducing a signal from an optical disk by emitting a light beam onto said optical disk through a reproducing part of an optical disk drive;

b) decreasing a gain of a low-pass filter of said optical disk drive having for the highest frequency of predetermined essential frequencies of a reproduced RF signal provided by said reproducing part; and c) detecting a tilt of the light beam with respect to the optical disk in said reproducing part based on the signal having said highest frequency having passed said low-pass filter.

4. A tilt adjustment method comprising the steps of:

a) reproducing a signal from an optical disk by emitting a light beam onto said optical disk through a reproducing part of an optical disk drive;

b) decreasing a gain of a low-pass filter of said optical disk drive having for the highest frequency of predetermined essential frequencies of a reproduced RF signal provided by said reproducing part;

c) detecting a tilt of the light beam with respect to the optical disk in said reproducing part based on the signal having said highest frequency having passed said low-pass filter; and d) adjusting a mechanical configuration of said optical disk so that the tilt detected in said step c) is minimized.

* * * * *